United States Patent [19]

Hubbell et al.

[11] Patent Number: 5,323,829
[45] Date of Patent: Jun. 28, 1994

[54] TIRE WITH CARBON FIBER REINFORCEMENT

[75] Inventors: Joseph K. Hubbell, Akron; Perry W. Bell, North Lawrence, both of Ohio; David L. Bair, Novi, Mich.; Surendra K. Chawla, Copley, Ohio; Mahmoud Assaad, Uniontown, Ohio; Warren L. Croyle, Wadsworth, Ohio; Joanne E. Shaw, Cuyahoga Falls, Ohio; Donald G. Vera, Uniontown, Ohio

[73] Assignee: The Goodyear Tire & Rubber Company, Akron, Ohio

[21] Appl. No.: 997,061

[22] Filed: Dec. 28, 1992

[51] Int. Cl.$^5$ .................. B60C 9/02; B60C 9/18; B60C 9/26; D02G 3/48

[52] U.S. Cl. .................. 152/527; 152/451; 152/528; 152/529; 152/531; 152/536; 152/543; 152/555; 152/556

[58] Field of Search .................. 152/451, 526–36, 152/539, 542–543, 548, 555–556, 531; 57/200, 258, 902; 428/295, 367

[56] References Cited

U.S. PATENT DOCUMENTS

| | | |
|---|---|---|
| 3,648,452 | 3/1972 | Young .................. 57/902 X |
| 3,778,396 | 12/1973 | Fujimoto et al. . |
| 3,807,476 | 4/1974 | Mills .................. 152/543 X |
| 4,044,540 | 8/1977 | Toki et al. .................. 57/902 X |
| 4,335,771 | 6/1982 | Reuter .................. 152/529 |
| 4,644,988 | 2/1987 | Ahmad et al. . |
| 4,711,286 | 12/1987 | Kabe et al. .................. 152/529 X |
| 4,722,381 | 2/1988 | Hopkins et al. .................. 152/528 X |
| 4,735,249 | 4/1988 | Kabe et al. . |
| 4,848,431 | 7/1989 | Kobayashi et al. .................. 152/548 |
| 4,934,431 | 6/1990 | Agari et al. .................. 152/543 |
| 5,029,627 | 7/1991 | Ochiai .................. 152/543 X |
| 5,048,584 | 9/1991 | Nakano et al. .................. 152/543 |
| 5,065,803 | 11/1991 | Nakatani et al. .................. 152/543 |
| 5,070,921 | 12/1991 | Wada et al. .................. 152/544 X |

FOREIGN PATENT DOCUMENTS

| | | | |
|---|---|---|---|
| 237599 | 9/1987 | European Pat. Off. . | |
| 0353621 | 2/1990 | European Pat. Off. | 152/556 |
| 3226678 | 1/1984 | Fed. Rep. of Germany . | |
| 505019 | 7/1920 | France | 152/556 |
| 568042 | 3/1924 | France | 152/556 |
| 50102678 | 8/1985 | Japan . | |
| 60-185603 | 9/1985 | Japan | 152/527 |
| 60-255502 | 12/1985 | Japan | 152/556 |
| 61-006006 | 1/1986 | Japan | 152/527 |
| 61-081803 | 4/1986 | Japan | 152/529 |
| 61-081804 | 4/1986 | Japan | 152/529 |
| 61-094802 | 5/1986 | Japan | 152/527 |
| 61-094803 | 5/1986 | Japan | 152/527 |
| 61-222802 | 10/1986 | Japan | 152/529 |
| 61-222803 | 10/1986 | Japan | 152/529 |
| 61-222804 | 10/1986 | Japan | 152/536 |
| 61-222805 | 10/1986 | Japan | 152/536 |
| 61-282105 | 12/1986 | Japan | 152/543 |
| 62-026103 | 2/1987 | Japan | 152/536 |
| 63-000325 | 1/1988 | Japan | 57/902 |
| 64-016404 | 1/1989 | Japan | 152/536 |
| 4031109 | 2/1992 | Japan | 152/543 |
| 1385704 | 2/1975 | United Kingdom . | |
| 2160158 | 12/1985 | United Kingdom . | |

*Primary Examiner*—Michael W. Ball
*Assistant Examiner*—Adrienne C. Johnstone
*Attorney, Agent, or Firm*—David E. Wheeler

[57] ABSTRACT

A pneumatic tire with carbon fiber cord reinforcement wherein the carbon fiber cords have a round cross sectional shape and a twist per inch (TPI) of 1.2 to 1.6 turns per inch (TPI) is provided. Preferably, the carbon fiber cords are coated with an RFL or epoxy/RFL adhesive. It is also preferred that carbon fiber cords having an S twist and carbon fiber cords having a Z twist be used in the same reinforcing plies in the tire. Especially preferred is the incorporation of carbon fiber cords in a folded belt.

12 Claims, 7 Drawing Sheets

TIRE WITH CARBON FIBER REINFORCEMENT

BACKGROUND OF THE INVENTION

The invention relates to a carbon fiber reinforced high performance radial tire having a folded belt structure.

It is continually the goal of the tire industry to improve the performance of tires used in racing and on high performance stock automobiles. Desirable characteristics of such tires are light weight, low drag, good traction, minimal runout, low noise, good handling, and low treadwear.

It is also a goal in the tire industry to engineer tire constructions for specific conditions and uses. It has been found that optimizing handling using one construction, or high speed durability using another construction, is possible.

It is the object of the present invention to provide lighter weight tires which have improved or maintained physical properties. It is also an object of the invention to identify tire construction changes that alter the properties of a tire to optimize their use under different conditions. Other objects of the invention will be apparent from the following specification and claims.

THE PRIOR ART

Young, in U.S. Pat. No. 3,648,452 teaches that carbon fibers, when twisted, demonstrate improved strength characteristics.

J 50 102 678/75 teaches carbon fibers coated with a resorcinol-formaldehyde-latex (RFL) adhesive, and German Offenlegungsschrift DE 3 226 678 teaches that epoxy resins can be used on carbon fibers, and U.S. Pat. No. 4,044,540 teaches that twisted, epoxy and RFL coated carbon fibers may be used in tires.

U.S. Pat. No. 4,735,249 and GB 2 160 158 teach the use of carbon cords in the bead area of a tire.

U.S. Pat. No. 3,778,396 teaches the use of chopped carbon fibers evenly distributed in a tire.

GB 1,385,704 teaches the use of a single layer of carbon filaments in the breaker or belt area of a tire.

EP 237,599 teaches polyaromatic amide fiber cords folded over a cut carbon fiber belt.

Kazyuki et al. in U.S. Pat. No. 4,735,249 teach the use of carbon fibers in the lower sidewall portion of a tire.

U.S. Pat. No. 4,644,988 teaches a folded glass belt structure in a tire.

DEFINITIONS

"Belt" refers to plies of parallel cords, woven or unwoven, underlying the tread, unanchored to the bead, and having cord angles of from 17 to 27 degrees with respect to the equatorial plane of the tire.

"Cut belt ply" refers to a belt having a width less than the tread width which lies flat over the carcass plies in the crown area of the tire.

"Crown" refers to that portion of the tire within the width limits of the tire tread in the area of the tire tread.

"Carcass ply" refers to plies of parallel cords anchored to both beads of the tire.

"Overlay" refers to nylon fabric or fiber reinforced rubber having a width substantially equivalent to the tread width which is placed over the belt structure in a tire to minimize delamination at the belt edges and to provide a smoother ride.

"Growth" refers to the gradual change of tire size over a period of time due to the effect of inflation pressure and service conditions.

"Footprint" refers to the area of contact of the tire tread with a flat surface at zero speed and under normal load and pressure or under specified load, pressure and speed conditions.

"High Performance Automobile" refers to stock cars that are designed for high speed such as Corvettes, Lanborgini, Ferrari, Porsch, etc.

"Lower sidewall" refers to the lower portion of the sidewall from the bead area to approximately the circumferential mid line of the tire excluding the shoulder area.

SUMMARY OF THE INVENTION

The invention relates to a pneumatic tire comprising a pair of annular beads, carcass plies wrapped around the beads, a belt structure over a crown portion of the carcass plies, preferably a folded belt structure, tread rubber disposed over the belt structure, and sidewalls disposed between the tread and the beads. The tire is characterized in that it is reinforced using carbon fiber cords having a round cross sectional shape and a twist per inch of about 1.2 to 1.6, preferably about 1.4. The carbon fiber cords are used as the longitudinal reinforcing members in carcass plies or in belt or breaker plies.

In a preferred embodiment, carbon fiber cords used as longitudinal reinforcing members in the reinforcing plies are prepared having both S and Z twists, and alternate S and Z twisted filaments are used in each ply.

The folded belt structure comprises a first belt ply having a width exceeding the tread width of a completed tire, and at least one additional belt ply having a width substantially equal to the tread width of the completed tire. In the building of the tire, the sides of the first belt ply are folded over the edges of the at least one additional belt ply thereby enveloping the at least one additional belt ply.

In the preferred, embodiment, the first belt ply is reinforced with RFL treated carbon fiber cords. The additional belt plies may be reinforced with steel cord reinforced plies or additional carbon fiber cord reinforced plies.

The tire may be made without an overlay, with one overlay, or with two overlays of nylon fabric over the folded belt structure. Similarly structured high speed prior art tires were suitable for use only when two or more overlays were used.

In alternative embodiments of the tire, the carcass plies may also be reinforced with carbon fiber cords, and carbon fiber cords also may be used in the form of inserts in the lower sidewall portion of the tire.

DETAILED DESCRIPTION OF THE INVENTION

Figure 1:
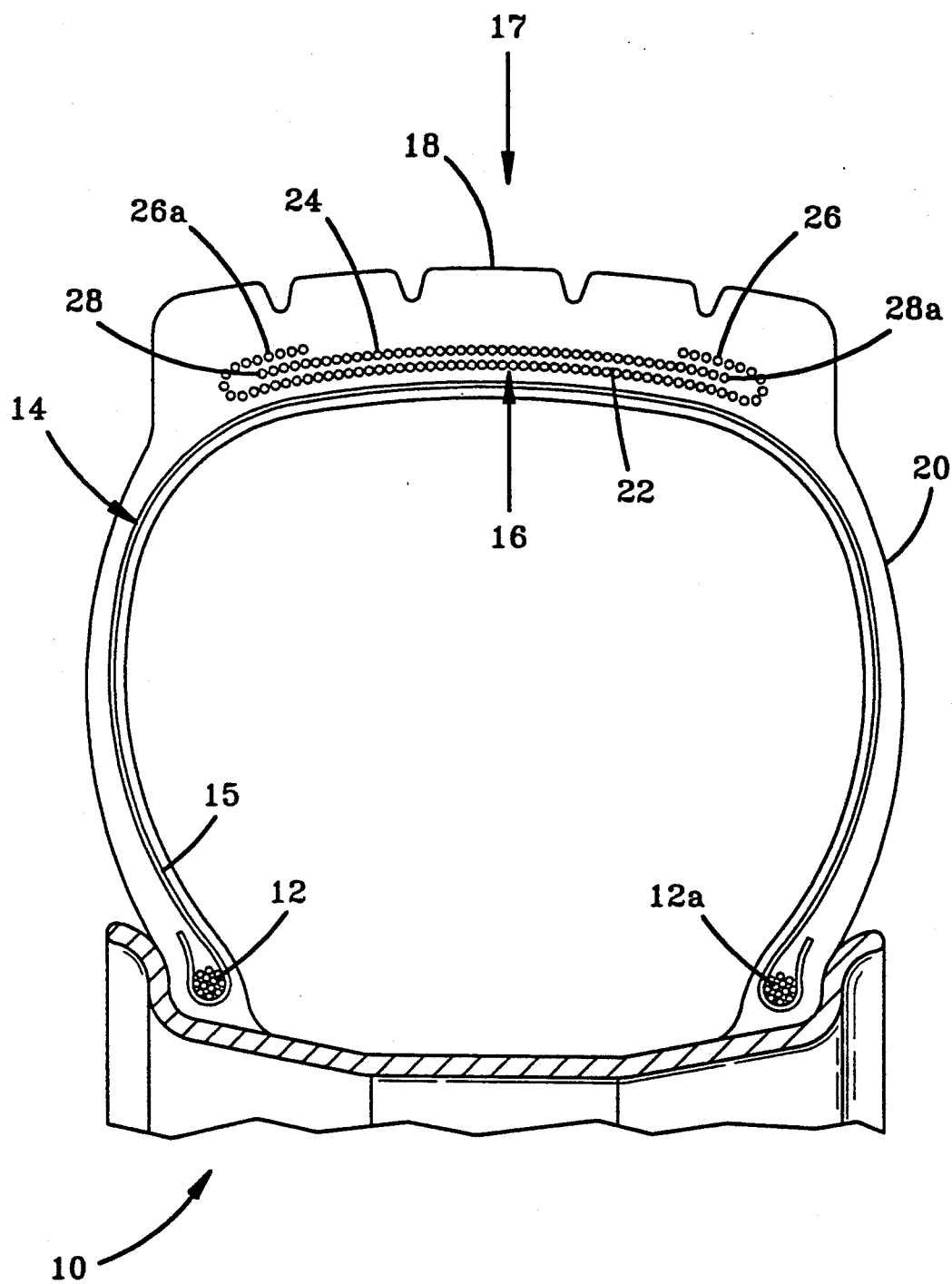
FIG. 1 illustrates a pneumatic tire having a carbon fiber cord containing folded belt structure.

With reference now to FIG. 1, a pneumatic tire 10 is illustrated having a pair of beads 12, 12a, radial carcass ply(s) 14 having longitudinal reinforcement members 15 wrapped around beads 12, 12a, folded belt structure 16 disposed over carcass ply 14 in a crown area 17 of the tire, tread portion 18 disposed over folded belt structure 16 and sidewalls 20 disposed between tread 18 and beads 12, 12a. Folded belt structure 16 further comprises first (folded) belt ply 22 and an additional cut belt ply 24.

To form folded belt structure 16, in the building of tire 10, first belt ply 22, having a width exceeding the tread width of the tire is laid down over carcass ply 14 in the crown region 17 of the tire. Thereafter, cut belt ply 24, having a width substantially equivalent to the tread width of the tire, is laid down over first belt ply 22, and the sides 26, 26a thereof are folded over the edges 28, 28a of cut belt 24.

When using a folded belt structure of the invention, it has been found that a belt package which is 2-6%, preferably about 4% wider, from folded edge to folded edge, than the conventional belt package for such tires, provides best results. The wider belt package reduces the strain on the folded belt structure, helps control shoulder rise, and the tread can be made using less rubber.

In the preferred embodiment first belt ply 22 is reinforced with substantially parallel longitudinal carbon fiber (CF) cords having a round cross sectional shape which are oriented with an angle of about 18°-30°, preferably 24°-28° with respect to the equatorial plane of the tire. Carbon fiber cords having an S twist are used together with carbon fiber cords having a Z twist.

When reinforcing structures that are made with an S twist only are used in a tire that the reinforcing structure has a tendency to creep or misalign. Making reinforcing structures using cords having both an S twist and cords have a Z twist side by side in each ply of a reinforcing structure prevents such misalignment. The S twist cords and Z twist cords may be employed at a ratio of 1:5 to 5:1 and may be employed in different patterns depending on the parts or the area of the tire in which they are used.

The carbon filaments are preferably coated with an RFL adhesive or an epoxy/RFL adhesive to facilitate bonding of the carbon fiber cords to the tire rubber.

It has been found that particularly good handling properties, good traction and low noise are obtained when the carbon fiber cords are used in the folded belt.

The carbon fibers used in the invention were obtained from BASF-AG and processed to the inventors' specifications by HOECHST CELANESE CORPORATION, Charlotte, N.C. Fabric was made using carbon fiber cords only in the warp direction. Rayon was used in the weft direction, but those skilled in the art will recognize that any conventional weft thread can be used to hold the carbon fiber cords together in the fabric.

The carbon fiber cords used in the illustrated embodiment consist essentially of a tow of 6000 filaments which have been bundled together in a 3600 denier strand and provided with a twist per inch of 1.2 to 1.6, preferably a twist of about 1.4.

The tow of filaments is processed to Goodyear specifications to provide cords having a round cross sectional shape. It has been found, in accordance with this invention, that carbon fiber cords having a flat cross sectional shape cannot be processed using conventional equipment.

Cord properties of a 6000 fiber cord tow (6K/1) are described in the following table. Those skilled in the art will recognize that the properties are comparable to those of aramid and fiber glass cords, prepared for use in a reinforcement ply, except for the % elongation at break.

TABLE I

| CORD PROPERTIES | |
|---|---|
| | CARBON |
| CONSTRUCTION | 6K/1 |
| BREAK STRENGTH, N | 498 |
| ELONGATION @ BREAK, % | 2.0 |
| GAUGE, MILS | 27 |
| STATIC ADHESION, N | 74 |
| IN-RUBBER FATIGUE MALLORY TUBE LIFE, CYCLES | 10,107 |

Composite plies made using carbon fiber cords have been made for laboratory testing with the following cord and belt parameters:

TABLE II

| | TWIST PER INCH | GA | EPI | RIVIT | TENSILE (LB) | IN ST (LB) | TREATMENT (LB/SQYD) |
|---|---|---|---|---|---|---|---|
| CARBON | 1.4 | 0.027 | 23 | 0.016 | 97 | 2231 | 1.96 |

Figure 4:
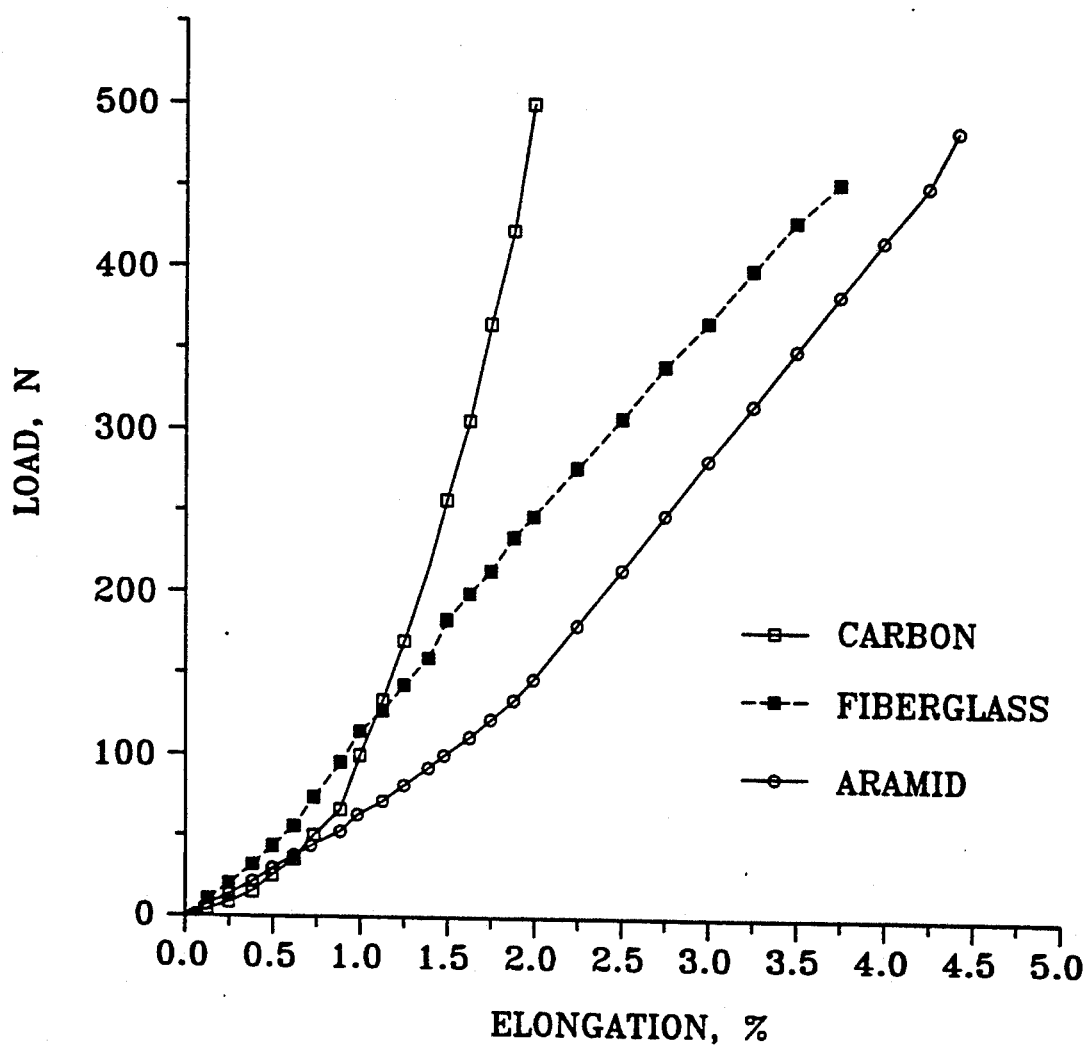
FIG. 4 shows a load deflection curve comparing carbon fiber cords with other materials.
Figure 5:
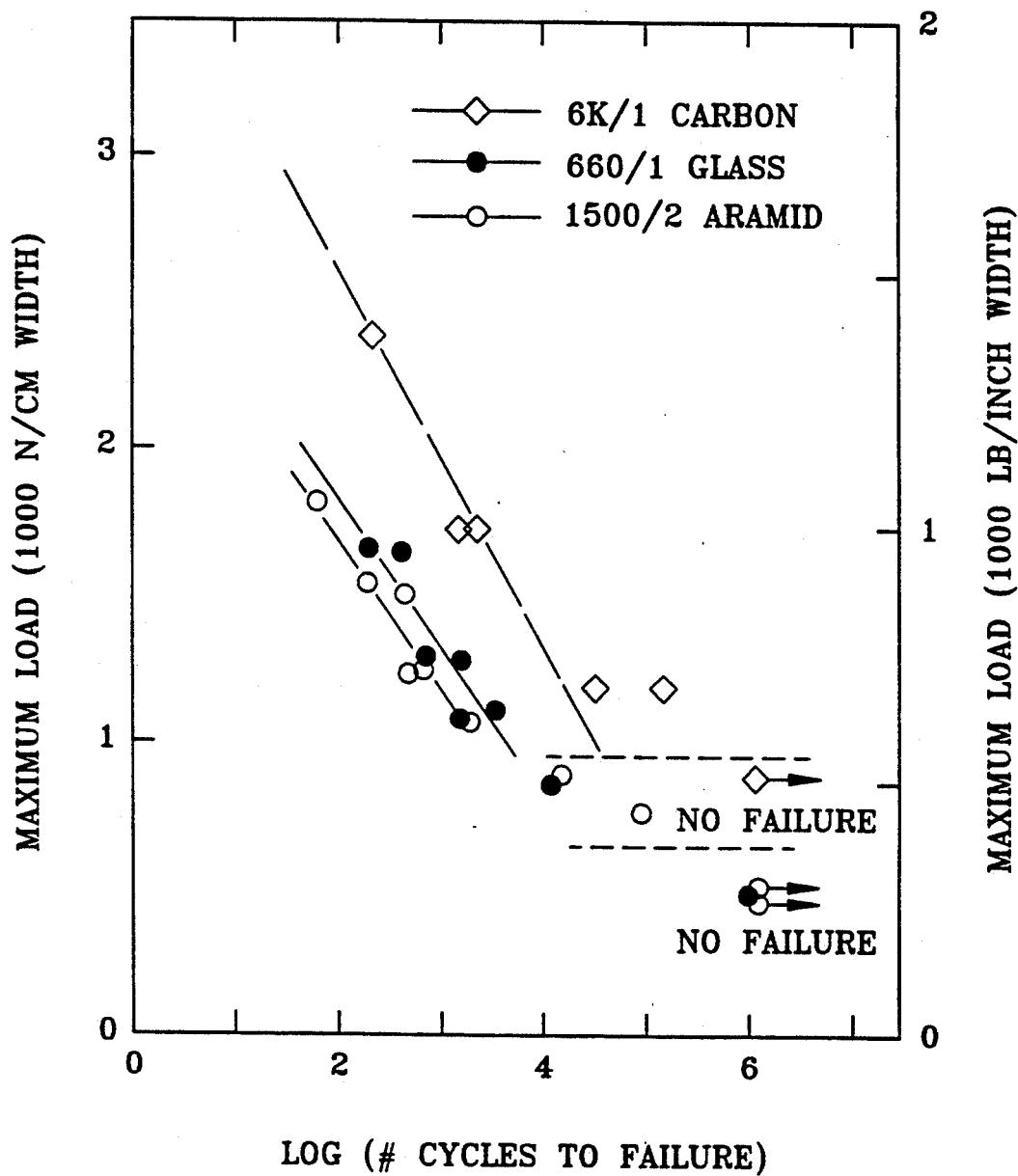
FIG. 5 shows a comparison of composite plies made with different materials demonstrating load and cycles to failure.
Figure 6:
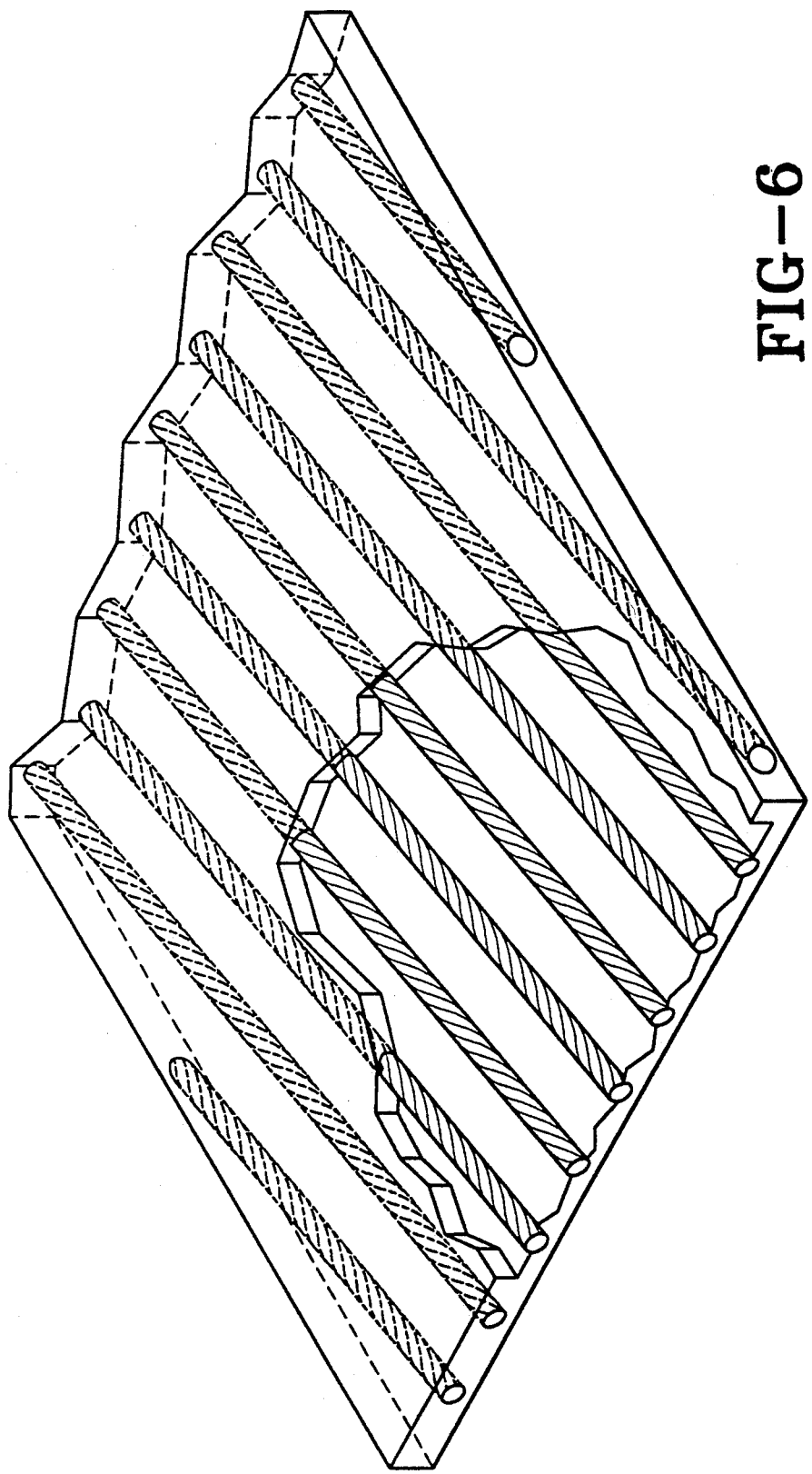
FIG. 6 illustrates a carbon fiber cord reinforced ply having alternate S twist and Z twist cords.

Carbon fiber cord/rubber composites have been compared with similar composites made using aramid cord reinforcement and glass fiber cord reinforcement as illustrated in FIGS. 4 and 5.

A stress analysis of various belts in a tire, for the stress/strain concentration near the edge of the belt, shows that the interlaminal shear strain at the belt edge is lowest (for the materials tested) for belts made with carbon fiber cords.

TABLE III

| CORD-RUBBER COMPOSITE STRESS ANALYSIS *VALUE OF MAJOR COMPONENT OF INTERLAMINAR SHEAR STRAIN THAT COULD CAUSE FAILURE AT THIS CRITICAL ZONE ARE (FEA ANALYSIS): | | | |
|---|---|---|---|
| STEEL | ARAMID | GLASS | CARBON |
| 2X.30HT | 1500/2 | 330/2 | 6K/1 |
| 15.62 | 15.93 | 18.18 | 12.33 |

Flexten, which is a treated aramid cord available from the Goodyear Tire & Rubber Company, has been used in embodiments of the invention.

The tire is otherwise constructed as is conventional in the art.

In a first embodiment of a tire of the invention cut belt 24 may comprise a steel belt ply reinforced with 16-24 epi of 2×0.30 mm diameter high tensile steel wires oriented 18°-30° with respect to the equatorial plane of the, tire. In an alternative embodiment, cut belt 24 may be reinforced with carbon fiber cords similar to those described for use in folded belt 22.

Those skilled in the art will recognize that any conventional belt structure and belt material may be used in the cut belt of the tire of the invention.

Figure 2:
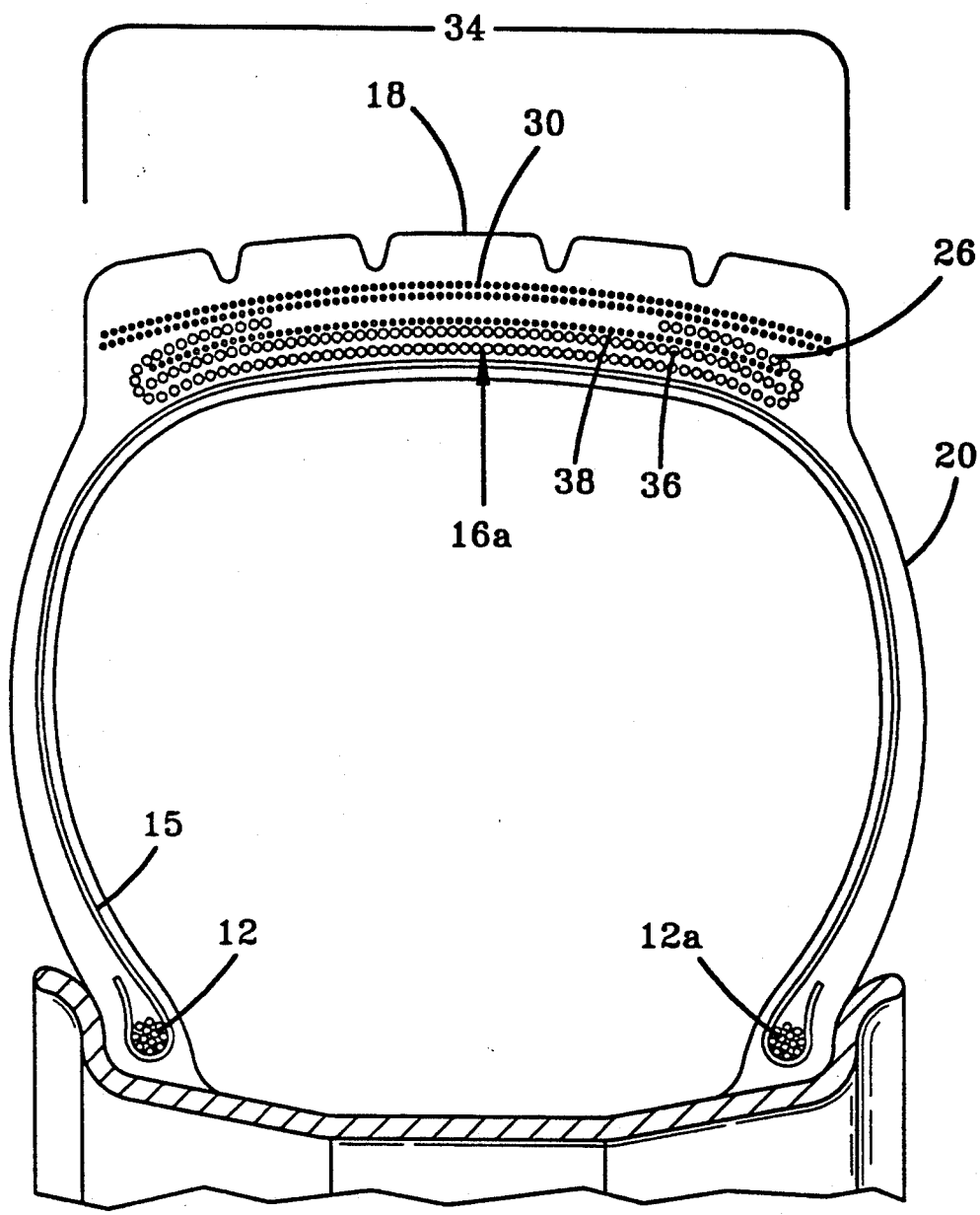
FIG. 2 illustrates a pneumatic tire having an additional overlay structure.

With reference now to FIG. 2, the tires of the invention may include an overlay structure 30, preferably containing at least 2 plies of overlay material reinforced with nylon fabric, to be applied to the folded belt structure prior to application of the tread. The overlay structure serves to control tire growth and to hold the edges of the folded belt structure in place. Preferably, the nylon overlay is reinforced with 1260/2, 850/1, 840/2, 420/2 or 210/2 nylon cords that may be woven or unwoven. Those skilled in the art will recognize that other overlay materials can be used.

Alternative materials that may be used in the overlay structure include short fiber composites.

Using a folded carbon fiber belt structure in a high speed tire may obviate the need for an overlay. Tires employing a folded carbon fiber belt structure having adequate properties have been built without an overlay, with one overlay, and with two overlays.

FIG. 2 also illustrates an embodiment in which two cut belts 36 and 38 are encompassed by single folded belt 16a. Cut belts 36 and 38 may be the same material or different materials and may be of conventional structure. Cut belts 36 and 38 may include as reinforcement: carbon fiber cords, steel cord, polyaramide, polyester, polyolefin, polyamide filaments or monofilaments and mixtures thereof.

Carbon fiber cords used in a folded belt structure can be used in tires having nylon, polyaramide, polyester or steel carcasses, or carcasses reinforced with mixtures of these materials. The tires can be made with nylon, polyaramide, carbon, polyester, or spiral wrap overlays.

Those skilled in the art will recognize that tires of the invention can also be made with any number of cut belts, preferably two to eight cut belts. Other possible structures of the tires of the invention will be apparent to those skilled in the art.

In the illustrated embodiment, the reinforcing members 15 in the carcass ply consist essentially of 1000/2, or 1000/3 polyester filaments. In an alternative embodiment, such reinforcing members may be carbon fiber cords or a mixture of cords selected from steel, carbon fibers, polyesters, polyamides, polyolefins and other synthetic reinforcing materials known in the art.

Figure 3:
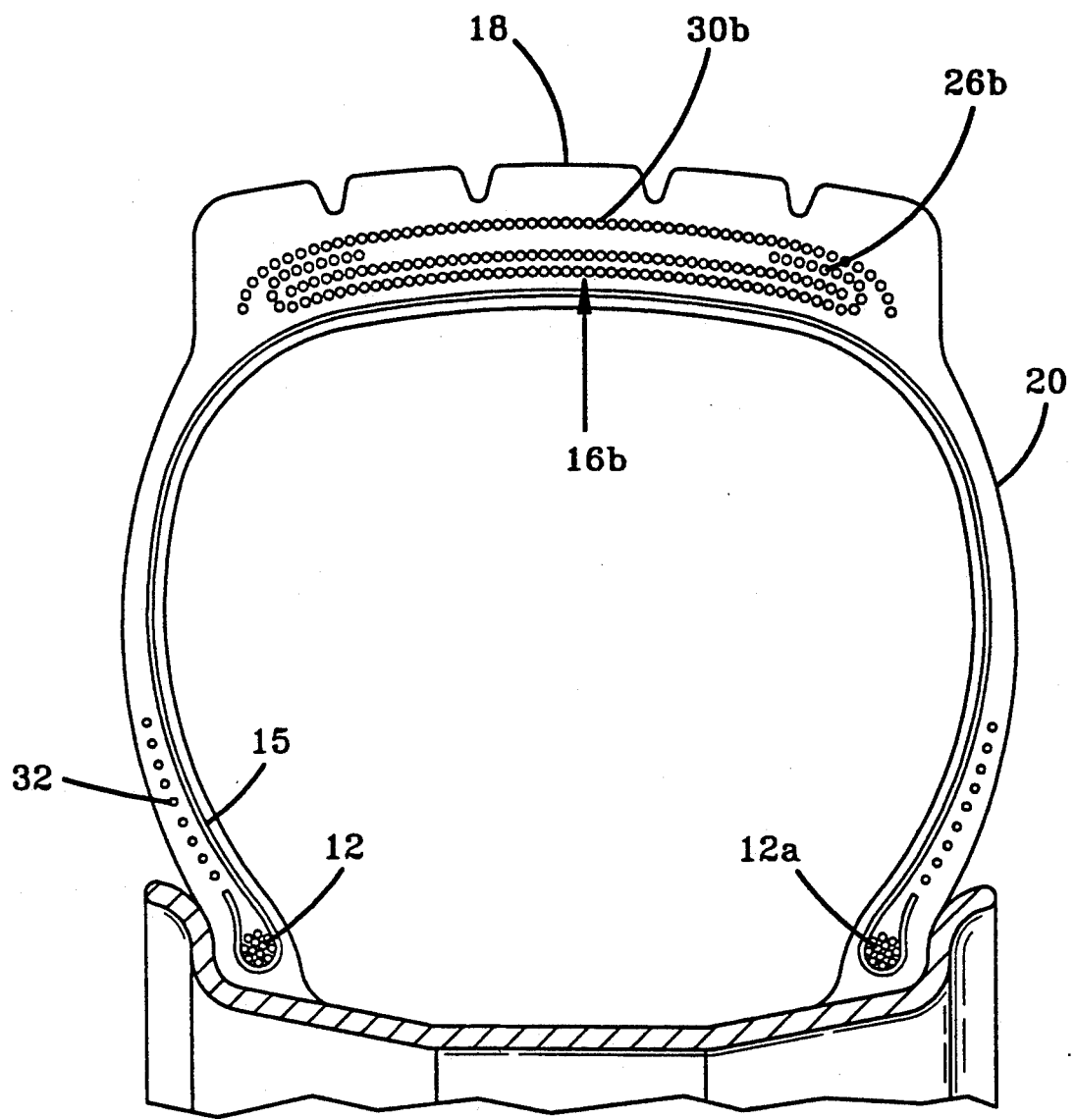
FIG. 3 illustrates a pneumatic tire having carbon fiber cord inserts.
Figure 3A:
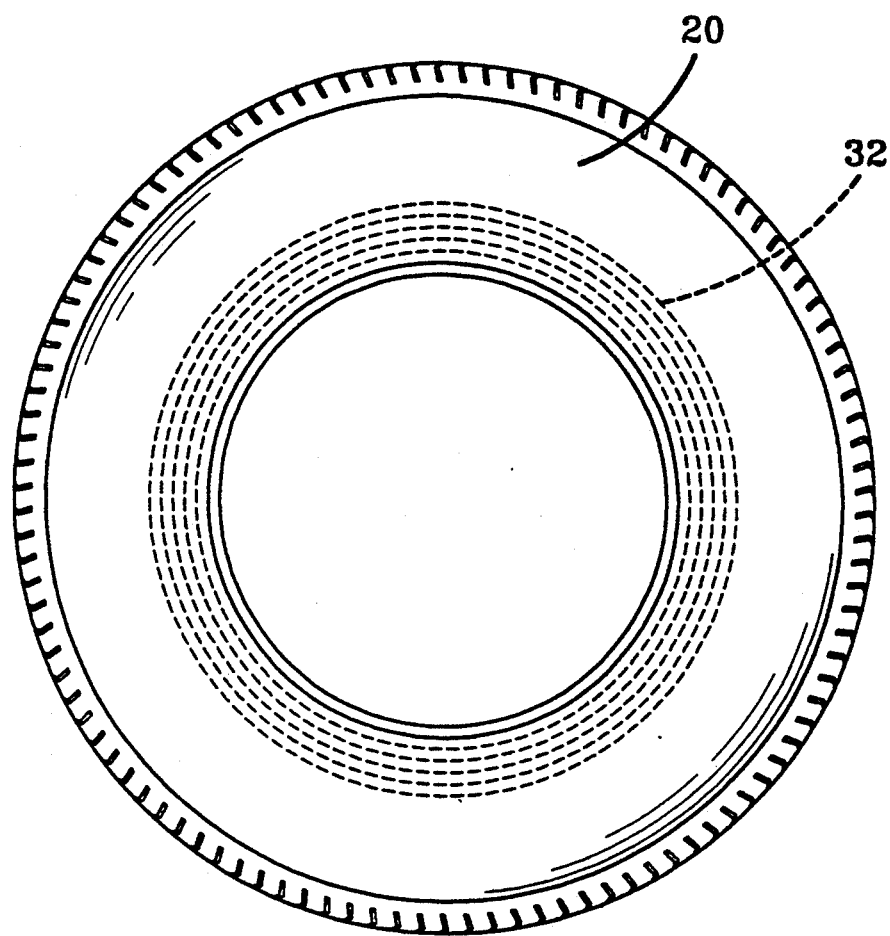
FIG. 3a illustrates a side view of the tire of FIG. 3 with carbon fiber cord reinforcement in the lower sidewall.

In an additional embodiment, further reinforcement may be provided on the lower sidewall portion of the tire by the addition of carbon fiber cord inserts 32 (FIGS. 3 and 3A).

The tires of the specifically illustrated invention are built for use at extremely high speeds, and in the development of the tire, it has been found that in a conventionally dimensioned tire, extra mass in the fold area causes spinning discontinuity because of the high centrifugal force developed at high speeds. It has been found that spinning discontinuity can be substantially eliminated by providing first belt ply 22 to have 4% greater width (measured between the edges of the folds) than conventional cut belts. It is believed that the width of the folded belt causes a more even distribution of the stresses in the belt area, thereby eliminating spinning discontinuity.

It has been theoretically calculated that even though steel ha a greater tensile strength ((stiffness), 4000 MPa) than carbon filaments (1350 MPa), because of the lower density of carbon filaments, and the corresponding reduced stresses encountered in a running tire, these factors cancel each other and a tire containing a carbon/steel folded belt construction has substantially the same growth characteristics as a similar tire having a carbon/carbon folded belt construction.

A folded belt structure having these dimensions, to some extent, also apparently contributes to more uniform distribution of forces in the footprint area of the tire. The tires of the invention demonstrate a vacuum pressure of 40 psi in the footprint area.

There are a number of interrelated factors that contribute to the footprint properties of the tire. These factors include density, speed, and belt stiffness, all of which contribute to the growth properties of the tire during running.

It has been observed that the tires of the invention exhibit less tread chunking than comparable tires made without a carbon fiber belt structure.

The invention is illustrated further with reference to the following examples, graphs and tables.

EXAMPLE 1

Goodyear Eagle ZR40 tires (P275/40ZR17) were constructed as is conventional in the art except for the deployment of a carbon fiber folded belt over the carcass plies in the crown area of the tire. The carbon fiber folded belt had an unfolded width of 13.2 inches and was made using alternating carbon fiber cords having S and Z twists. Each carbon fiber cord had a twist per inch of 1.4 and was pretreated with an RFL dip. The carbon fiber folded belt was prepared with a carbon fiber cord end count of 23 epi (ends per inch).

EXAMPLE 2

This example (see Table I) illustrates the properties of several tires made in accordance with the invention (1-3) as compared to prior art tires (4-6). Each of tires 1-4 and 6 was constructed as is conventional for the Goodyear Eagle ZR40 except for the structure of the belt package. All the tires were made with a belt package 4% wider than the production Eagle ZR40 tires. Tire 5 is identical to the Eagle ZR40 construction except that the cord angle of the belt reinforcing members has been slightly changed so that the cord angles in all the tire constructions are the same.

Tire constructions #1 and #2 are made using two folded carbon fiber belts, belt 1 turned up around belt 2. Construction #1 employs one nylon overlay and construction #2 employs no overlay. Construction #6 employs two folded steel belts in a similar configuration with one overlay.

Construction #3 employs a carbon fiber belt folded around a cut steel belt with one turn of overlay (see FIG. 3).

Construction #4 employs two cut carbon fiber belts with two turns of overlay material.

Construction #5 is a conventional tire used as a control.

Of the tests run, it is believed that the high speed durability property is most important in a high performance tire. It is believed that the order of importance of the remaining tests is: dry handling test, wet handling test, subjective handling test and then the noise, vibration and harshness tests (NVH). It is believed the rolling test (a measure of rolling resistance) on the 67" wheel, the twin roll resistance test, the residual self-aligning torque (RSAT), and the Force and Moment tests (F &

M) are equivalent to each other but of lesser importance than the other five tests.

two turns of overlay material to achieve satisfactory results.

TABLE IV

| | TIRE TESTING | | | | | | | | |
|---|---|---|---|---|---|---|---|---|---|
| | 1 | 2 | 3 | 4 | 5 | 6 | 7 | 8 | 9 |
| | | | | | TESTING | | | | |
| CODE & DESCPT | NVH | SUBJ HAND | MAX WET HAND | MAX DRY HAND | HIGH SPEED | ROLLING 67" LBS. | RES TWNROL LBS. | RSAT NM | F&M F(1) |
| 1. (2 FOLDED CF BELTS) 1 TURN O/L | OK | — | (BEST) OK+ | (BEST) OK+ | (BEST) S/F 10 @ 198 | 12.5 | 23.98 | −2.84 | (BEST) .3745 |
| 2. (LIKE 1, NO O/L) | OK | (BEST) OK | OK | OK | 10 @ 198 CNK | (BEST) 12.0 | 23.28 | −3.46 | .3588 |
| 3. (CF FOLDED AROUND STEEL) 1 TURN O/L | — | OK | OK− | OK− | 10 @ 198 CNK | 12.5 | (BEST) 23.18 | (BEST) −2.11 | .3288 |
| 4. (CUT CF BELTS) 2 TURNS O/L | — | OK | OK | OK | 10 @ 198 CNK | 12.2 | 23.63 | −4.11 | .3244 |
| 5. (CUT STEEL CONTROL) 2 TURNS O/L | (BEST) OK | OK | OK | OK | 10 @ 198 CNK | 12.3 | 23.63 | −4.56 | .3395 |
| 6. (2 FOLDED MICROALLOY STEEL BELTS) 1 TURN O/L | OK | OK− | OK− | (BEST) OK+ | 10 @ 198 CNK | 12.5 | 23.73 | −2.92 | .3318 |

The first four tests are somewhat subjective since the tests, to a large extent, rely on the opinions of a test car's driver. In the table, (+) indicates a positive opinion by the driver, and (−) indicates a negative or "less than average" opinion. It is noted that lap time is an objective component of these tests.

The high speed test is a machine test where the tire is mounted and run against a drum at a speed from 124 to 198 mph for 10 minute intervals. The speed was increased in 6.2 mph steps. S/F (stop/finish) indicates that the tire survived the test without any chunking. CNK indicates that slight chunking was observed. For the rolling tests and the RSAT test, lower numbers indicate better rolling resistance properties and residual self-aligning torque properties, respectively.

Higher numbers for the F & M test indicate better lateral grip properties. (The ratio of the measured lateral force (LF) generated by the tire, to the total downward force (RF) on the tire (LF/TF) is a measurement of lateral grip at a 1% slip angle.

The data in the table indicates that tires using two carbon fiber folded belts gave the best overall results. Also, the data illustrates that a satisfactory tire can be built without an overlay or by using only one turn of overlay material when a folded carbon belt is used, whereas conventional high performance tires require

EXAMPLE 3

A second build of Eagle ® ZR40 tires was used for additional testing. The constructions used are summarized at the top of Table II. Construction A, the control, was made using only cut steel belts. Construction B used a folded carbon fiber belt and carbon fiber cut belt. Construction C is the same as B except for the absence of an overlay. Constructions F, G and H are all made with fiber cut belts and differ only in the overlay used as defined in the Table. W, X, Z and U spiral overlays are defined by the structure of the layup. A "W" layup has two spiral layers under the center of the tread portion, and three layers on each shoulder. An "X" layup has two spiral layers across the crown of the tire. A "Z" layup has overlapped spiral layers, two layers under the center of the tread, and four layers on each shoulder. A "U" layup is one spiral layer across the tire with two turns in each shoulder.

In addition to the twin roll, handling and RSAT data obtained, additional high speed tests were carried out under different inflation conditions in order to identify differences due to inflation.

The letter designations in Table VI coincide with the same constructions described in Table V.

TABLE V

| | TIRE TESTING | | | | | | | | | |
|---|---|---|---|---|---|---|---|---|---|---|
| CONSTRUCTION DETAILS | NVH | SUBJ HANDLING | WET HANDLING | DRY HANDLING | HIGH SPEED | ROLLING RESIST. 67" | TWIN ROLL | RSAT | F&M | FATIGUE CAPACITY |
| A CUT STEEL CONTROL 840/2 W SPIRAL | = | = | = | = | = | 100 | 100 | 100 | 100 | P |
| B FOLDED CF BELTS 420/2 X SPIRAL | =/− | + | + | = | ++ | 95 | 101 | 107 | 96 | NOT RUN |
| C FOLDED CF BELTS NO OVERLAY | =/− | ++ | =/− | − | ++ | 102 | 102 | 97 | 101 | F |
| F CUT CF BELTS 840/2 W SPIRAL | =/− | + | − | − | − | 104 | 105 | 82 | 101 | P |
| G CUT CF BELTS 420/2 Z SPIRAL | =/− | = | − | + | −− | 101 | 102 | 66 | 102 | NOT RUN |
| H | =/− | =/− | = | ++ | −− | 106 | 102 | 89 | 107 | NOT RUN |

TABLE V-continued

| CONSTRUCTION DETAILS | NVH | SUBJ HAND-LING | WET HAND-LING | DRY HAND-LING | HIGH SPEED | ROLLING RESIST. 67" | TWIN ROLL | RSAT | F&M | FATIGUE CAPACITY |
|---|---|---|---|---|---|---|---|---|---|---|
| CUT CF BELTS 420/2 U SPIRAL | | | | | | | | | | |

LEGEND:
SUBJECTIVE
= SAME AS CONTROL
=/+ SLIGHTLY BETTER THAN CONTROL
+ BETTER THAN CONTROL
++ MUCH BETTER THAN CONTROL
=/- SLIGHTLY WORSE THAN CONTROL
- WORSE THAN CONTROL
-- MUCH WORSE THAN CONTROL
OBJECTIVE
100% CONTROL
>100% BETTER THAN CONTROL
<100% WORSE THAN CONTROL
FATIGUE CAPACITY
P = PASSES DURABILITY CRITERIA
F = FAILS DURABILITY CRITERIA

TABLE VI

| | 26 PSI FM (100% T & RA) | | 26 PSI @ 970 LBS | | | |
|---|---|---|---|---|---|---|
| TIRE CONST | F (1) | AT (1) | HS TIME @ SPEED | FAILURE MODE | HS TIME @ SPEED | FAILURE MODE |
| A | .4773 | 15.36 | 3 @ 183 | B/O | 6 @ 174 | CNK |
| B | .4534 | 17.51 | 5 @ 198 | CNK | — | — |
| C | .4869 | 18.85 | 10 @ 187 | CNK | 3 @ 188 | CNK |
| F | .4316 | 17.77 | 9 @ 174 | CNK | 4 @ 174 | CNK |
| G | — | — | — | — | — | — |
| H | — | — | — | — | — | — |

B/O MEANS BLOW OUT
CNK MEANS CHUNKING
SEP MEANS PLY SEPARATION
S/F MEANS STOP AT FINISH

CONCLUSIONS

The folded carbon fiber belt with no overlay was best for subjective handling.

The folded carbon fiber belt with X 420/2 spiral overlay was best for wet handling, cut carbon fiber belts were down slightly from the control.

The cut carbon fiber belt with Z and U 420/2 spiral overlay was best for dry handling, and the folded belt constructions were equal to down slightly compared to control.

The folded belt carbon fiber constructions were better than cut steel controls for high speed; machine max at 200 mph, no failure. Cut carbon fiber constructions all ran 1 to 4 speeds steps lower than the control, less overlay being worse.

The folded carbon fiber belt with overlay was down 5% for 67" rolling resistance, folded belts with no overlay were 2% better.

The folded carbon fiber belt tire failed lab durability testing. The cut steel control and cut carbon fiber belted with 840/2 W spiral overlay both passed the lab durability test.

Both of the folded CF belt tires and the cut steel control had higher corner coefficient at low pressure than at high pressure. The cut CF belt tire had slightly lower cornering coefficient at low pressure.

Carbon fiber belt tires had a larger increase in aligning torque than the steel control at low inflation pressure.

The folded CF belt tires performed substantially better on high speed than either cut belt tire. Folded belt tires ran well on high speed regardless of whether or not they had an overlay.

The tire with the folded carbon fiber belt had better high speed durability performance at low inflation pressure than the cut steel belted control tire.

While specific embodiments of the invention have been illustrated and described, those skilled in the art will recognize that the invention may be variously modified and practiced without departing from the spirit of the invention. The invention is limited only by the following claims.

What is claimed is:

1. A pneumatic tire comprising at least one pair of beads, reinforced carcass plies wrapped around said pair of beads, a folded belt structure and tread rubber disposed over said carcass plies, and sidewalls disposed between said beads and said tread, wherein said folded belt structure comprises at least one belt ply having substantially parallel reinforcing members consisting essentially of resorcinol-formaldehyde-latex (RFL) treated carbon fiber cords having a twist per inch of 1.2 to 1.6 and wherein said folded belt structure comprises a first carbon fiber cord reinforced belt ply having a width exceeding a tread width of a completed tire, and at least one additional belt ply having a width substantially equal to the tread width of the completed tire, wherein the sides of said first belt ply are folded over the edges of said at least one additional belt ply enveloping said at least one additional belt ply.

2. The pneumatic tire of claim 1 wherein said first belt ply is reinforced with resorcinol-formaldehyde-latex (RFL) treated carbon fiber cords, and said additional belt ply is reinforced with steel cord.

3. The pneumatic tire of claim 1 wherein said first belt ply is reinforced with resorcinol-formaldehyde-latex (RFL) treated carbon fiber cords, and said at least one additional belt ply is reinforced with RFL treated carbon fiber cords.

4. The pneumatic tire of claim 1 in which said carbon fiber cords have a round cross sectional shape.

5. The pneumatic tire of claim 1 in which said carbon fiber cord reinforced belt ply contains carbon fiber cords having an S twist and carbon fiber cords having a Z twist in the ratio of 5:1 to 1:5.

6. The pneumatic tire of claim 1 which further comprises at least one overlay of nylon fabric.

7. The pneumatic tire of claim 1 wherein said sidewall portion comprises a lower sidewall containing reinforcing members consisting essentially of resorcinol formaldehyde latex (RFL) treated carbon fiber cords having a twist per inch of 1.2 to 1.6.

8. A pneumatic tire comprising at least one pair of beads, reinforcement plies wrapped around said at least one pair of beads, a folded belt structure disposed over said reinforcement plies in a crown area of said tire, a tread disposed over said folded belt structure, and a sidewall portion between said beads and said tread, wherein;
  (a) said reinforcement plies have substantially parallel longitudinal reinforcing members consisting essentially of resorcinol-formaldehyde-latex (RFL) treated carbon fiber cords having a round cross sectional shape and a twist per inch of 1.2 to 1.6,
  (b) said belt structure comprises a belt ply having substantially parallel longitudinal reinforcing members consisting essentially of resorcinol-formaldehyde-latex (RFL) treated carbon fiber cords having a twist per inch of 1.2 to 1.6, and
  (c) said sidewall portion comprises a lower sidewall and an upper sidewall and wherein said lower sidewall portion contains reinforcing members consisting essentially of resorcinol-formaldehyde-latex (RFL) treated carbon fiber cords having a twist per inch of 1.2 to 1.6 and wherein said folded belt structure comprises a first carbon fiber cord reinforced belt ply having a width exceeding a tread width of a completed tire, and at least one additional belt ply having a width substantially equal to the tread width of the completed tire, wherein the sides of said first belt ply are folded over the edges of said at least one additional belt ply.

9. The pneumatic tire of claim 8 in which said carbon fiber cord reinforced belt ply contains carbon fiber cords having an S twist and carbon fiber cords having a Z twist in a ratio of 5:1 to 1:5.

10. The pneumatic tire of claim 8 wherein said first belt ply is reinforced with resorcinol-formaldehyde-latex (RFL) treated carbon fiber cords, and said at least one additional belt ply is reinforced with steel cord.

11. The pneumatic tire of claim 8 wherein said first belt ply is reinforced with resorcinol-formaldehyde-latex (RFL) treated carbon fiber cords and said at least one additional belt ply is reinforced with resorcinol-formaldehyde-latex (RFL) treated carbon fiber cords.

12. The pneumatic tire of claim 8 which further comprises at least one overlay of nylon fabric.

* * * * *